US010275376B2

(12) United States Patent
Narasimha et al.

(10) Patent No.: US 10,275,376 B2
(45) Date of Patent: Apr. 30, 2019

(54) EFFICIENT CROSS DEVICE REDUNDANCY IMPLEMENTATION ON HIGH PERFORMANCE DIRECT ATTACHED NON-VOLATILE STORAGE WITH DATA REDUCTION

(71) Applicant: Western Digital Technologies, Inc., San Jose, CA (US)

(72) Inventors: Ashwin Narasimha, Los Altos, CA (US); Krishanth Skandakumaran, Los Gatos, CA (US); Vijay Karamcheti, Palo Alto, CA (US); Ashish Singhai, Los Altos, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 496 days.

(21) Appl. No.: 15/058,461

(22) Filed: Mar. 2, 2016

(65) Prior Publication Data

US 2017/0255402 A1    Sep. 7, 2017

(51) Int. Cl.
*G06F 3/06* (2006.01)
*G06F 13/28* (2006.01)
*G06F 12/14* (2006.01)

(52) U.S. Cl.
CPC .............. *G06F 13/28* (2013.01); *G06F 3/061* (2013.01); *G06F 3/064* (2013.01); *G06F 3/0659* (2013.01); *G06F 3/0688* (2013.01); *G06F 12/1408* (2013.01); *G06F 3/067* (2013.01); *G06F 2212/402* (2013.01)

(58) Field of Classification Search
None
See application file for complete search history.

(56) References Cited

U.S. PATENT DOCUMENTS

| 6,438,586 | B1  | 8/2002  | Hass et al. |
| 6,772,310 | B2  | 8/2004  | Thompson et al. |
| 7,152,182 | B2  | 12/2006 | Ji et al. |
| 7,388,978 | B2* | 6/2008  | Duvdevani ........ G06K 9/00973 382/141 |

(Continued)

FOREIGN PATENT DOCUMENTS

EP    2 592 625    5/2013

*Primary Examiner* — Brian R Peugh
(74) *Attorney, Agent, or Firm* — Loza & Loza, LLP; Gabriel Fitch

(57) ABSTRACT

A method for implementing cross device redundancy schemes with a single commit by receiving, by a write page allocation unit, a request to allocate data grains; responsive to receiving the request, performing, by the write page allocation unit, an analysis of a predetermined data layout map associated with a grain memory to identify a memory segment; allocating, by the write page allocation unit, a number of data grains to the memory segment, while computing redundancy data associated with the number of data grains; storing the number of data grains and the redundancy data to the memory segment of the grain memory; determining, by the write page allocation unit, whether a storage threshold associated with the grain memory has been satisfied; and responsive to the storage threshold associated with the grain memory being satisfied, transmitting data grains and redundancy data stored in the memory segment to one or more storage devices.

24 Claims, 9 Drawing Sheets

(56) References Cited

U.S. PATENT DOCUMENTS

| | | |
|---|---|---|
| 8,527,693 B2 | 9/2013 | Flynn et al. |
| 8,656,101 B2 | 2/2014 | Werner et al. |
| 2015/0019792 A1 | 1/2015 | Swanson et al. |
| 2016/0371267 A1* | 12/2016 | Narasimha .......... G06F 17/3033 |

* cited by examiner

EFFICIENT CROSS DEVICE REDUNDANCY IMPLEMENTATION ON HIGH PERFORMANCE DIRECT ATTACHED NON-VOLATILE STORAGE WITH DATA REDUCTION

BACKGROUND

The present disclosure relates to computing cross device redundancy data. In particular, the present disclosure describes computing redundancy data and storing it in pre-designated locations. Still more particularly, the present disclosure relates to providing a single commit guarantee associated with data and redundancy data.

High performance non-volatile storage systems are becoming prevalent as a new level in traditional storage hierarchy. Furthermore, existing methods attempting to implement redundancy schemes in the event of a power failure include various forms of Redundant Array of Independent Disks (e.g., RAID 5, RAID 6) or more complicated schemes such as Erasure Coding to secure the data against single or multiple device failures. However, the existing redundancy schemes and device failure methods require two commits, one for data and another for redundancy data. These existing methods, regardless of how the redundancy data is computed results in a double commit, which is a performance bottleneck. The present disclosure solves problems associated with redundancy data in storage devices by providing a highly reliable system for implementing cross device redundancy schemes with a single commit.

SUMMARY

The present disclosure relates to systems and methods for implementing cross device redundancy schemes with a single commit. According to one innovative aspect of the subject matter in this disclosure, a system for storage and data reduction comprises a compression unit having an input and an output for compressing data, the input of the compression unit coupled to receive a data stream, the compression unit compressing the data stream to produce data grains; a write page allocation unit having an input and an output for transferring data grains to the one or more storage devices and generating redundancy data, the input of the write page allocation unit coupled to the output of the compression unit to receive data grains, the output of write page allocation unit coupled to the one or more storage devices; and a grain memory for temporarily storing data and having an input and an output, the input coupled to the write page allocation unit and the output coupled to the one or more storage devices. The system may also include; an encryption unit having in an input and an output for encoding the data to produce an encoded data stream, the input of the encryption unit coupled to receive the data stream and the output of the encryption unit coupled to an input of the write page allocation unit; allocation logic for analyzing a predetermined data layout map associated with the grain memory to identify a memory segment of the grain memory for temporary storage of data grains, the allocation logic coupled to the compression unit and the grain memory; a data queue for temporarily storing grains until they can be stored in the grain memory, the data queue having an input and an output, the input coupled to the data queue coupled to the compression unit and the output of the data queue coupled to the allocation logic; and a DMA command unit for transferring data from the grain memory directly to the one or more storage devices.

In general, another innovative aspect of the subject matter described in this disclosure may be implemented in methods that include: receiving, by a write page allocation unit, a request to allocate data grains; responsive to receiving the request, performing, by the write page allocation unit, an analysis of a predetermined data layout map associated with a grain memory to identify a memory segment; allocating, by the write page allocation unit, a number of data grains to the memory segment, while computing redundancy data associated with the number of data grains; storing the number of data grains and the redundancy data to the memory segment of the grain memory; determining, by the write page allocation unit, whether a storage threshold associated with the grain memory has been satisfied; and responsive to the storage threshold associated with the grain memory being satisfied, transmitting data grains and redundancy data stored in the memory segment to one or more storage devices.

Other implementations of one or more of these aspects include corresponding systems, apparatus, and computer programs, configured to perform the actions of the methods, encoded on computer storage devices.

These and other implementations may each optionally include one or more of the following features. For instance, the operations further include: receiving, by a compression unit from a client device, a data stream; and compressing, by a compression unit, the data stream into a plurality of data grains; identifying an active write page associated with the predetermined data layout map; retrieving a pointer associated with presently stored data grains in the active write page of the predetermined data layout map; determining unavailable location data associated with the active write page based on the pointer, the unavailable location data reflecting occupied storage space; and determining available location data associated with the active write page of the predetermined data layout map based on the pointer; storing the redundancy data into one or more pre-provisioned memory buffers of the grain memory; and computing, valid bits per the one or more pre-provisioned memory buffers based on incoming data grains. The operations further include: recording a starting location associated with the predetermined data layout map for a first data grain associated with the number of data grains being allocated to the memory segment; and updating the predetermined data layout map associated with the grain memory based on the allocating of the number of data grains; storing in parallel the data grains and redundancy data across a plurality of storage devices; generating, a template for transmitting data grains and redundancy data to a plurality of storage devices; and transferring data grains and redundancy data directly from the grain memory to the plurality of storage devices using the template. Other features include: wherein transmitting data grains and redundancy data stored in the memory segment uses a preconfigured template, wherein the template comprises at least an offset and a number of bytes associated with the data grains and redundancy data, wherein the storage threshold is 32K bytes; and wherein the grain size is 512 bytes. Additional features include where allocating the number of data grains to the memory segment is performed simultaneously with computing redundancy data.

These implementations are particularly advantageous in a number of respects. For instance, the technology describes herein can be used for implementing cross device redundancy schemes with a single commit.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems and methods for implementing a cross device (or cross drive) redundancy architecture are described below. In particular, in the present disclosure, systems, and methods for implementing cross device (or cross drive) redundancy in storage devices and specifically in flash-storage devices are described below. While the systems and methods of the present disclosure are described in the context of particular system architecture that uses flash-storage, it should be understood that the systems and methods can be applied to other architectures and organizations of hardware and other memory devices with similar properties.

The present disclosure relates to allocating data based on a predetermined data layout map of a Write Page Allocation (WPA) unit and computing cross device redundancy data. In some embodiments, the present disclosure describes computing redundancy data for storage applications and allocation simultaneously. The present disclosure distinguishes from prior implementations by solving the following problems: computation of redundancy data, storing the redundancy data in pre-designated locations and providing data commit that guarantees data in case of a sudden power failure. Additionally, the existence of the WPA unit allows use of a single commit flow for writing data, which results in performance as well as firmware code complexity advantages. Thus, the present disclosure solves problems associated with redundancy data in storage devices by providing a highly reliable system for implementing cross device redundancy schemes with a single commit.

System

Figure 1:
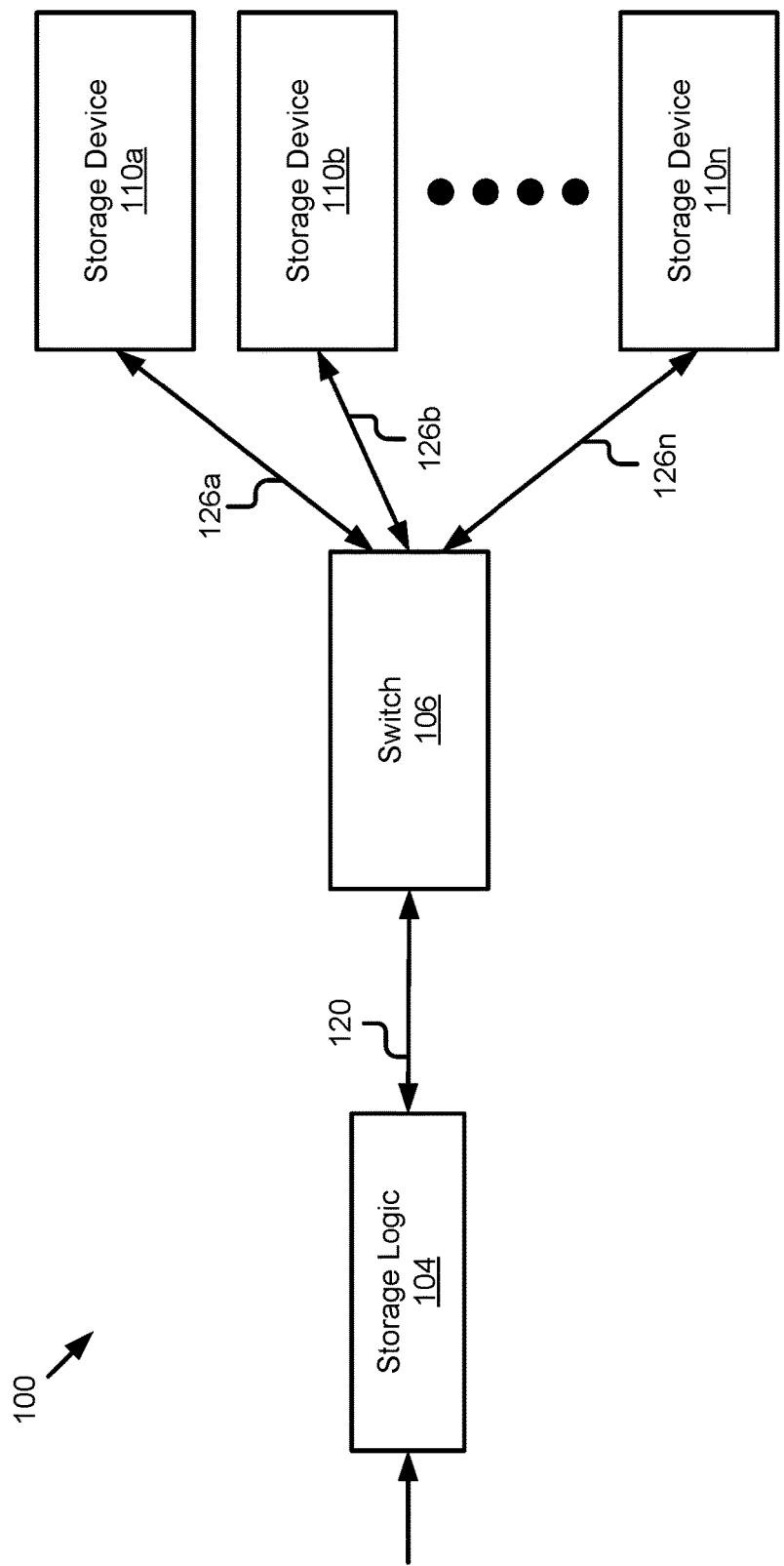
FIG. 1 is a high-level block diagram illustrating an example system for implementing cross device redundancy schemes with a single commit according to the techniques described herein.

FIG. 1 is a high-level block diagram illustrating an example system 100 for implementing cross device redundancy schemes with a single commit according to the techniques described herein. In the depicted embodiment, the system 100 may include storage logic 104, a switch 106, and one or more storage devices 110a, 110b through 110n. In the illustrated embodiment, the storage logic 104 and the one or more storage devices 110a, 110b through 110n are communicatively coupled via switch 106. However, the present disclosure is not limited to this configuration and a variety of different system environments and configurations can be employed and are within the scope of the present disclosure. Other embodiments may include additional or fewer components. It should be recognized that FIG. 1 as well as the other figures used to illustrate an embodiment, and an indication of a letter after a reference number or numeral, for example, "110a" is a specific reference to the element or component that is designated by that particular reference numeral. In the event a reference numeral appears in the text without a letter following it, for example, "110," it should be recognized that such is a general reference to different embodiments of the element or component bearing that general reference numeral.

In some embodiments, the storage logic 104 provides cross device redundancy schemes. The storage logic 104 can provide computing functionalities, services, and/or resources to send, receive, read, write, and transform data from other entities of the system 100. In some embodiments, the storage logic 104 can be a computing device configured to make a portion or all of the storage space available on storage devices 110. The storage logic 104 is coupled to the switch 106 via signal line 120 for communication and cooperation with the storage devices 110a-110n of the system 100. In other embodiments, the storage logic 104 transmits data between the storage devices 110 via the switch 106. It should be recognized that multiple storage logic units 104 can be utilized, either in a distributed architecture or otherwise. For the purpose of this application, the system configuration and operations performed by the system are described in the context of a single storage logic 104.

The switch 106 can be a conventional type, wired, and may have numerous different configurations. Furthermore, the switch 106 may include an Ethernet, InfiniBand, PCI-Express switch, and/or other interconnected data paths switches, across which multiple devices (e.g., storage devices 110) may communicate. Although the example of FIG. 1 illustrates a single switch 106, in practice one or a plurality of switches 106 can connect the entities of the system 100.

The storage devices 110a, 110b through 110n, may include a non-transitory computer-usable (e.g., readable, writeable, etc.) medium, which can be any non-transitory apparatus or device that can contain, store, communicate, propagate or transport instructions, data, computer programs, software, code routines, etc., for processing by or in connection with a processor. In some embodiments, the storage devices 110a, 110b through 110 communicate and cooperate with the storage logic 104 by switch 106 via signal lines 126a, 126b though 126n. While the present disclosure reference to the storage devices 110 as flash memory, it should be understood that in some embodiments, the storage devices 110 may include a non-transitory memory such as a dynamic random access memory (DRAM) device, a static random access memory (SRAM) device, or some other memory devices.

Figure 2:
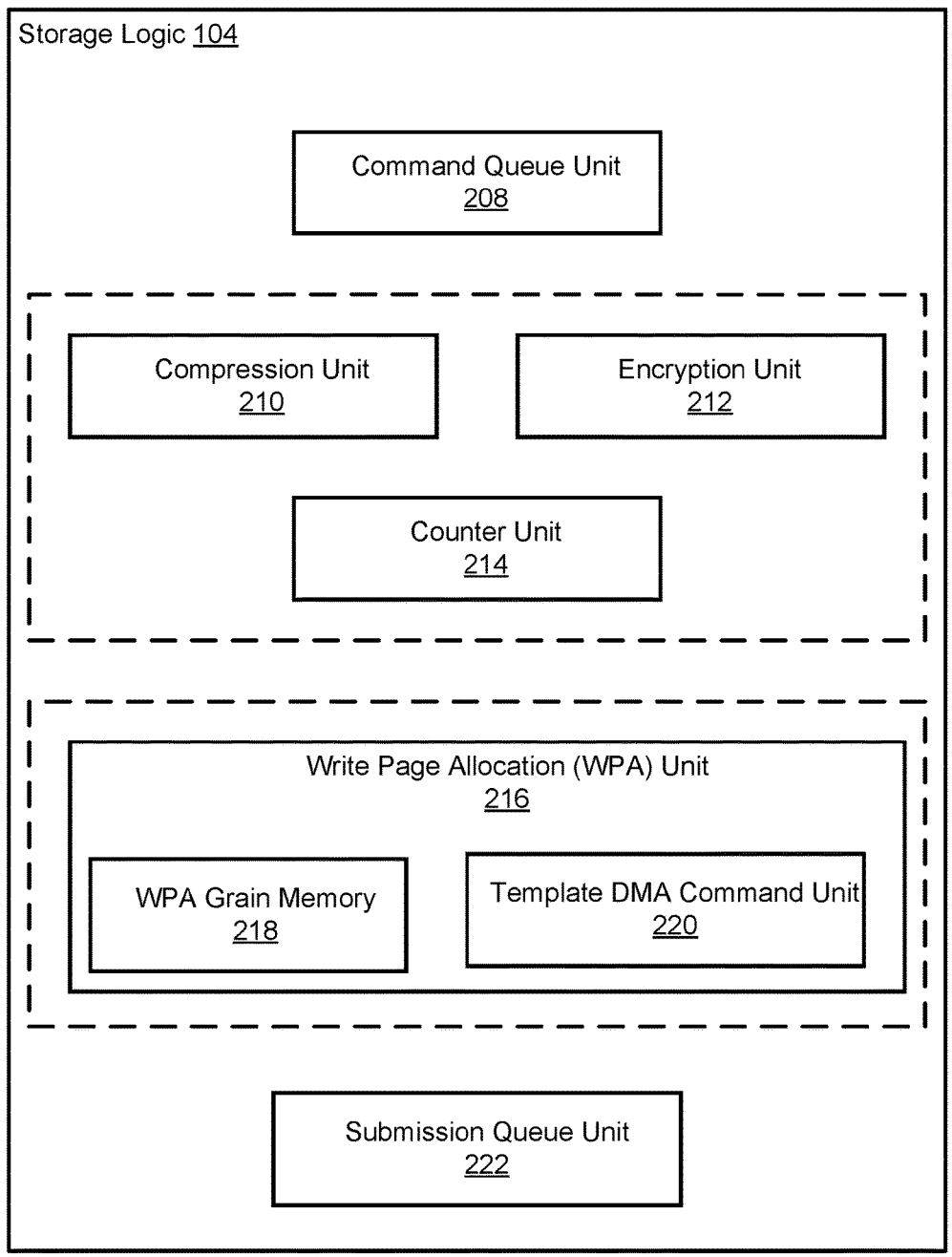
FIG. 2 is a block diagram illustrating an example of storage logic according to the techniques described herein.

FIG. 2 is a block diagram illustrating an example of storage logic 104 according to the techniques described herein. The storage logic 104 is combinational logic, firmware, software, code, or routines or some combination thereof for implementing cross device redundancy schemes. As depicted in FIG. 2, the storage logic 104 may include a command queue unit 208, a compression unit 210, an encryption unit 212, a counter unit 214, a WPA unit 216, a template Direct Memory Access (DMA) command unit 220, and a submission queue unit 222, which may be electronically communicatively coupled by a communication bus (not shown) for cooperation and communication with each other. These components 208, 210, 212, 214, 216, 220, and 222 are also coupled for communication with the other entities (e.g., storage devices 110) of the system 100 via the switch 106.

In one embodiment, the command queue unit 208, the compression unit 210, the encryption unit 212, the counter unit 214, the WPA unit 216, the template DMA command unit 220, and the submission queue unit 222 are hardware for performing the operations described below. In some embodiment, the command queue unit 208, the compression unit 210, the encryption unit 212, the counter unit 214, the WPA unit 216, the template DMA command unit 220, and the submission queue unit 222 are sets of instructions executable by a processor or logic included in one or more customized processors, to provide its respective functionalities. In some embodiments, the command queue unit 208, the compression unit 210, the encryption unit 212, the counter unit 214, the WPA unit 216, the template DMA command unit 220, and the submission queue unit 222 are stored in a memory and are accessible and executable by a processor to provide its respective functionalities. In further embodiments, the command queue unit 208, the compression unit 210, the encryption unit 212, the counter unit 214, the WPA unit 216, the template DMA command unit 220, and the submission queue unit 222 are adapted for cooperation and communication with a processor and other components of the system 100. The particular naming and division of the units, modules, routines, features, attributes, methodologies and other aspects are not mandatory or significant, and the mechanisms that implement the present invention or its features may have different names, divisions, and/or formats.

The command queue unit 208 is a buffer and software, code, or routines for receiving data and commands from one or more devices. In one embodiment, the command queue unit 208 receives a data stream (data packets) from one or more devices and prepares them for storage in a non-volatile storage device (e.g. storage devices 110). In some embodiments, the command queue unit 208 receives incoming data packets and temporally stores the data packets into a memory buffer. In further embodiments, the command queue unit 208 receives 4K data blocks and allocates them for storage in one or more storage devices 110. In other embodiments, the command queue unit 208 may include a queue schedule that queues data blocks of data streams associated with a plurality of devices such that, the storage logic 104 processes the data blocks based on the data blocks corresponding position in the queue schedule. In some embodiments, the command queue unit 208 receives a data stream from one or more devices and transmits the data stream to the compression unit 210 and/or one or more other components of the storage logic 104 based on the queue schedule.

The compression unit 210 is logic, software, code, or routines for reducing the amount of storage required to store data. In one embodiment, the compression unit 210 receives a data stream from the command queue unit 208 and compresses the data stream into a number of data grains. In some embodiments, the compression unit 210 receives a data stream from a device, compresses the data stream into a number of data grains, and temporarily stores the number of data grains in a memory buffer. In further embodiments, the compression unit 210 receives data blocks and compresses each data block into a number of data grains. A data grain can be a representation of a maximum compression granularity (e.g., smallest data size a data block of a data stream can be compressed to).

In one embodiment, compression of a data stream, data block, and/or data packet by the compression unit 210 can be based on a size of the corresponding data stream, data block, and/or the data packet. For example, a data stream, data block, and/or data packet received by the compression unit 210 can be of a predefined size (e.g., 4K bytes), and the compression unit 210 may compress the data stream, the data block, and/or the data packet based on the predefined size (4K bytes) to a compressed size of 512 bytes data grains. In other embodiments, the compression unit 210 may compress a data stream including data blocks based on a compression algorithm such as, but not limited to, a propriety-encoding algorithm, deduplication algorithm, etc.

In other embodiments, the compression unit 210 compresses data blocks of a data stream based on a format associated with the data blocks. For instance, data blocks of a data stream can be associated with a certain format, and the compression unit 210 compresses the data blocks into predefined segments based on the format. In some embodiments, the compression unit 210 transmits the segmented compressed data blocks to one or more components of the storage logic 104 to perform its acts and/or functionalities thereon. A non-limiting example of formats associated with data blocks may include, but is not limited to, .doc, .pdf, .csv, .txt, .mp4, .jpeg, .png, .ppt, etc. In further embodiments, the compression unit 210 compresses a data stream based on constraints associated with a device (e.g. WPA grain memory 218, storage devices 110, etc.). A constraint can be based on a size of memory associated with a device (e.g., WPA grain memory 218, storage devices 110) for storing a number of data grains, data blocks, etc.

In one embodiment, responsive to compressing a data stream, the compression unit 210 may transmit a request to the WPA unit 216. A request associated with a data stream may include at least one of, but is not limited to, a request for temporarily storing the data stream in a memory buffer, storing data of the data stream to a storage device (e.g., storage device 110), uploading data of the data stream via switch 106, modifying data of the data stream, etc. In some embodiments, the compression unit 210 determines an active WPA unit from a set of WPA units for transmitting the compressed data stream to the determined active WPA unit 216 for further processing. The determination of an active WPA unit 216 by the compression unit 210 can be performed based on response messages received from each WPA unit of the set. In further embodiments, the compression unit 210 determines an active WPA unit for a compressed data stream based on a format (e.g. data type) associated with data blocks of the data stream. For instance, an active WPA unit can be assigned a format (e.g., data type) for processing data blocks satisfying the format. In one embodiment, the compression unit 210 transmits a set of compressed data blocks (e.g., data grains) of a data stream to different active WPA units for further processing. For instance, the compression unit 210 transmits a first set of compressed data blocks of a data stream to a first active WPA unit, and transmits a remaining set of compressed data blocks of the data stream to a second active WPA unit, as described elsewhere herein.

In further embodiments, the compression unit 210 determines an active WPA unit of a set of WPA units for further processing the compressed data stream based on a queue schedule associated with each WPA unit. For instance, the compression unit 210 may transmit a compressed data stream to a WPA unit with available processing slots in the queue schedule.

In one embodiment, the compression unit 210 compresses a data stream including data blocks, determines an active WPA unit 216 for further processing the compressed data blocks, and transmits the compressed data blocks to the active WPA unit 216 while, concurrently transmitting the compressed data blocks to memory buffers of the WPA grain memory 218. In further embodiments, the compression unit 210 can temporarily store a compressed data stream in a memory buffer (not shown) while, waiting for one or more WPA units 216 to become available, before transmitting the compressed data stream to the WPA units 216 to perform its functions.

The encryption unit 212 is logic, software, code, or routines for encrypting data. In one embodiment, the encryption unit 212 receives a data stream from the command queue unit 208 and encrypts the data stream. In some embodiments, the encryption unit 212 receives a compressed data stream from the compression unit 210 and encrypts the data stream. In further embodiments, the encryption unit 212 encrypts only a portion of a data stream and/or a set of data blocks associated with a data stream.

The encryption unit 212, in one embodiment, encrypts data blocks associated with a data stream and/or compressed data stream responsive to instructions received from the command queue unit 208. For instance, if a user elects for encrypting data associated with user financials, while opting out from encrypting data associated with general data files (e.g. documents available to public, such as, magazines, newspaper articles, pictures, etc.), the command queue unit 208 receives instructions as to which file to encrypt and provides them to the encryption unit 212. In further embodiments, the encryption unit 212 encrypts a data stream and/or compressed data stream based on encryption algorithms. An encryption algorithm can be user defined and/or known-encryption algorithms such as, but not limited to, hashing algorithms, symmetric key encryption algorithms, and/or public key encryption algorithms. In other embodiments, the encryption unit 212 may transmit the encrypted data stream and/or compressed encrypted data stream to the WPA grain memory 218 while transmitting the encrypted/compressed data stream to one or more components of the storage logic 104 to perform its acts and/or functionalities thereon.

The counter unit 214 is a storage register or memory and logic or routines for assigning a count associated with data. In one embodiment, the counter unit 214 tracks/computes valid bits (e.g. counts) per pre-provisioned memory buffers (e.g., per logic memory buffer of the WPA grain memory 218). In some embodiments, the counter unit 214 maintains a table of valid bits per pre-provisioned memory buffer (portions of memory) by tracking, updating, and modifying valid bits associated with memory buffers. In some embodiments, the counter unit 214 in cooperation with the WPA unit 216 maintains valid bits per redundancy data buffers, so that the system 100 can guarantee that the provisioned buffers (e.g. per logic memory buffer of the WPA grain memory 218) will be constructed using valid and consistent data.

The WPA unit 216 is logic, software, code, or routines for allocating incoming data. The WPA unit 216 may include the WPA grain memory 218 and the template DMA command unit 220. The WPA grain memory 218 may include memory buffers for storing data temporarily. In one embodiment, the WPA grain memory 218 temporarily stores a data stream, data blocks, data grains (e.g. compressed and/or compressed/encrypted) while, one or more components of the storage logic 104 generate redundancy data associated with the data stream and/or data blocks. In some embodiments, the storage of the data stream, data blocks or data grains and generation of the redundancy data are performed simultaneously. For the embodiments of the present application, "simultaneously" means any of the following: 1) storing the data stream, data blocks, or data grains at the same time the redundancy is generated, e.g., beginning and ending at approximately the same time; 2) storing the data stream, data blocks, or data grains partially overlapping in time with when the redundancy is generated; or 3) generating the redundancy data partially overlapping in time with when any of the data stream, data blocks, or data grains are being stored. In other embodiments, the WPA unit 216 stores data grains in the WPA grain memory 218, while concurrently storing data stream and redundancy data to the storage device 110.

In one embodiment, the WPA unit 216 receives a request associated with allocating a number of data grains. For instance, the WPA unit 216 receives a request associated with a unit ID and a number of data grains of the compressed data stream that requires allocation. A unit ID may include, but is not limited to, information specific to a data stream and used for identification by the one or more components of the storage logic 104 which storage device in which to store the data stream. In other embodiments, WPA unit 216 receives from the compression unit 210 a request associated with allocating a number of data grains of a compressed data stream to the WPA unit 216.

In one embodiment, the WPA unit 216 receives an encrypted data stream from the encryption unit 212 and allocates the encrypted data stream to one or more storage devices 110 and/or to the WPA grain memory 218. In further embodiments, the WPA unit 216 receives a compressed and encrypted data stream from the encryption unit 212 and allocates the compressed and encrypted data stream to one or more storage devices 110 and/or the WPA grain memory 218.

In one embodiment, responsive to receiving a data stream (e.g. compressed data stream and/or encrypted data stream) and/or the request, the WPA unit 216 in cooperation with the compression unit 210 performs an analysis of a predetermined data layout map associated with the WPA unit 216. A predetermined data layout map may include information such as, but not limited to, unavailable location data and a number of available (unrestricted) location data of an active write page associated with the predetermined data layout map, as described in more detail with reference to FIGS. 7 and 8. For instance, a predetermined data layout map may include a matrix/table with rows and columns. A row of the predetermined data layout map can be indicative of storage space (e.g. available grain storage location or filled grain storage locations), while columns of the predetermined data layout map can reflect one or more devices (e.g., storage devices 110). It should be understood, that the above configurations of the predetermined data layout map are provided by way of example and numerous further configurations are contemplated and possible.

Furthermore, an analysis of a predetermined data layout map associated with the WPA unit 216 may include, but is not limited to, determining active write page for corresponding data grains of a number of data grains based on an analysis of the predetermined data layout map. Moreover, in some embodiments, the analysis may include, the WPA unit 216 retrieving pointers associated with presently stored data grains in an active write page of a predetermined data layout map. The WPA unit 216 can then determine unavailable location data and/or available location data associated with the active write page based on the pointers. For instance, pointers associated with presently stored data grains can be indicative that a corresponding data grain is occupying a storage space (e.g., data block) in the predetermined data layout map. In some embodiments, a predetermined data layout map can be user defined and/or defined based on processing constraints, as described below.

In one embodiment, subsequently to performing an analysis of a predetermined data layout map, the WPA unit 216 determines routing data associated with allocating each data grain of a number of data grains (e.g. compressed data stream) to a number of unrestricted grain locations (e.g. available data locations) in a predetermined data layout map. In some embodiments, the WPA unit 216 determines routing data associated with allocating each data grain of a number of data grains to at least one unrestricted (available data) location of a number of unrestricted data locations based on an analysis of the predetermined data layout map associated with the WPA unit 216. In some embodiments, the WPA unit 216 concurrently determines a first routing data for allocating each data grain to a location in a predetermined data layout map, and a second routing data including information associated with XOR-ing and/or parity protecting (e.g. computing redundancy data on) the data grains associated with the compressed data stream and/or encrypted/compressed data stream.

The WPA unit 216 as described elsewhere herein eliminates a double commit requirement by allowing redundancy data to be generated while the data blocks (data grains) are transferred from the compression unit 210 into WPA logic memory buffers of the WPA grain memory 218. The WPA 216 can map and write each data grain of a number of data grains to an unrestricted grain location(s) in the predetermined data layout map, while simultaneously generating redundancy data associated with each data grain during the writing/transferring of each data grain. The WPA unit 216 may then store, modify, or update simultaneously the redundancy data in the predetermined data layout map. Mapping by the WPA unit 216 may include, but is not limited to, mapping between a logical block and a physical location of a compressed grain stored in a predetermined data layout map. Furthermore, a physical location may include, for example, a physical location on a raw flash device, or on a managed flash device or on a managed flash drive. The WPA unit 216, in some embodiments, computes redundancy data in parallel and on different devices by using parity schemes such as RAID5 or RAID6 or Cauchy Reed Solomon based erasure code, while transmitting a number of data grains from the compression unit 210 to the WPA unit 216. Further, once the parity data (e.g. redundancy data) is computed and updated in place, the compressed user data (of a data stream) is protected against failure.

The WPA unit 216, in one embodiment, records a starting location associated with the predetermined data layout map for a first data grain associated with a number of data grains being allocated to the WPA unit 216. In some embodiments, the WPA unit 216 updates the predetermined data layout map with a physical address of the first grain. In further embodiments, the WPA unit 216 updates the predetermined data layout map with physical addresses of the corresponding data grains (data block) stored. For instance, the WPA unit 216 subsequently updates its corresponding predetermined data layout map based on the allocating of the one or more data grains. The WPA unit 216 can then route data blocks (e.g., uncompressed, compressed and/or encrypted data blocks) as well as redundancy data to one or more storage devices (e.g. flash devices or managed flash drives). In one embodiment, the WPA unit 216 allocates each data grain of the number of data grains based on memory availability (unavailable/available location data) of the predetermined data layout maps of a corresponding (active) WPA unit 216.

In one embodiment, computation of redundancy data associated with a number of data grains can be distributed and computed in portions by the WPA unit 216. In some embodiments, the WPA unit 216 computes redundancy data (parity data) on data blocks (number of data grains) while, simultaneously receiving the data blocks (number of data grains) from the compression unit 210, by performing exclusive OR (XOR) functions on the data blocks (e.g. data grain). In other embodiments, the WPA unit 216 computes redundancy data (parity data) on data blocks, before transferring the data blocks to the storage device 110. Furthermore, in some embodiments, the WPA unit 216 can distribute/transfer a portion and/or fully computed redundancy data (parity data) among one or more storage devices 110, while transferring the data blocks to a corresponding storage device (or storage drive). In further embodiments, the WPA unit 216 transmits a complete redundancy/parity data to a pre-provisioned memory buffer associated with a redundancy data storage, while transmitting portions of the redundancy/parity data to other pre-provisioned memory buffers associated with other redundancy data storage. Redundancy data/parity data is a computed value used to reconstruct data blocks after a device failure (e.g. power failure of storage devices 110), while data blocks are written/transferred to the storage devices 110.

In one embodiment, the WPA unit 216 computes valid bits per pre-provisioned memory buffers (e.g., per logic memory buffer of the WPA grain memory 218). In some embodiments, the WPA unit 216 computes valid bits for a first set of per pre-provisioned memory buffer for compressed data, and in parallel computes valid bits for a second set of pre-provisioned memory buffers associated with redundancy data. This allows the WPA unit 216 in cooperation with one or more other components of the storage logic 104 to provide the system 100 data guarantees during failure scenarios. In some embodiments, the WPA unit 216 may perform an analysis of a failed device and reconstruct data block(s) based on portions of redundancy data stored throughout storage devices and/or pre-provisioned memory buffers of the WPA grain memory 218. In addition, the WPA unit 216 in cooperation with one or more other components of the storage logic 104 maintain valid bits per redundancy data buffers, so that the system 100 can guarantee that the provisioned buffers (e.g. per logic memory buffer of the WPA grain memory 218) will be constructed using valid and consistent data. In one embodiment, the WPA unit 216 issues commands to transfer compressed data blocks to storage devices 110 (backend nonvolatile storage device(s)) based on preconfigured template, as described elsewhere herein.

The template DMA command unit 220 is software, code, logic, or routines for providing flexibility in communication and operation between a variety of backend drives. In one embodiment, the template DMA command unit 220 receives formatted DMA commands from the WPA unit 216 and transfers data (e.g. compressed data blocks, redundant data blocks, etc.) from a memory buffer of the WPA grain memory 218 into the storage devices 110 and/or backend devices (or managed drives). In one embodiment, the template DMA command unit 220 receives a DMA template defined and configured by a user. For instance, a user via an application rendered by the client device 102 defines a template of DMA commands using software and/or any other software/hardware configuration. In some embodiments, the template DMA command unit 220 transmits the template of DMA commands to the WPA unit 216, and the WPA unit 216 modifies the template of DMA commands. Modification of the template of DMA commands by the WPA unit 216 may include, but is not limited to, modifying fields such as SRAM offsets to use, number of bytes to transfer, direction, placing data blocks in a proper format and writing a command to the proper address in storage device 110 and/or the backend device (managed drives).

The submission queue unit 222 is software, code, logic, or routines for queuing data for storage. In one embodiment, the submission queue unit 222 receives data (e.g. 32K data block) and temporally stores the data into a memory buffer (not shown). For instance, the submission queue unit 222 can temporarily store a data stream in a memory buffer while, waiting for one or more components to complete processing of other tasks, before transmitting the data stream to the one or more components to perform its acts and/or functionalities thereon. In some embodiments, the submission queue unit 222 receives 32K data blocks and allocates the 32K data blocks for storage in one or more storage devices 110. In further embodiments, the submission queue unit 222 receives a data stream from the WPA grain memory 218 and transmits the data stream to the storage devices 110 for storage.

Figure 3:
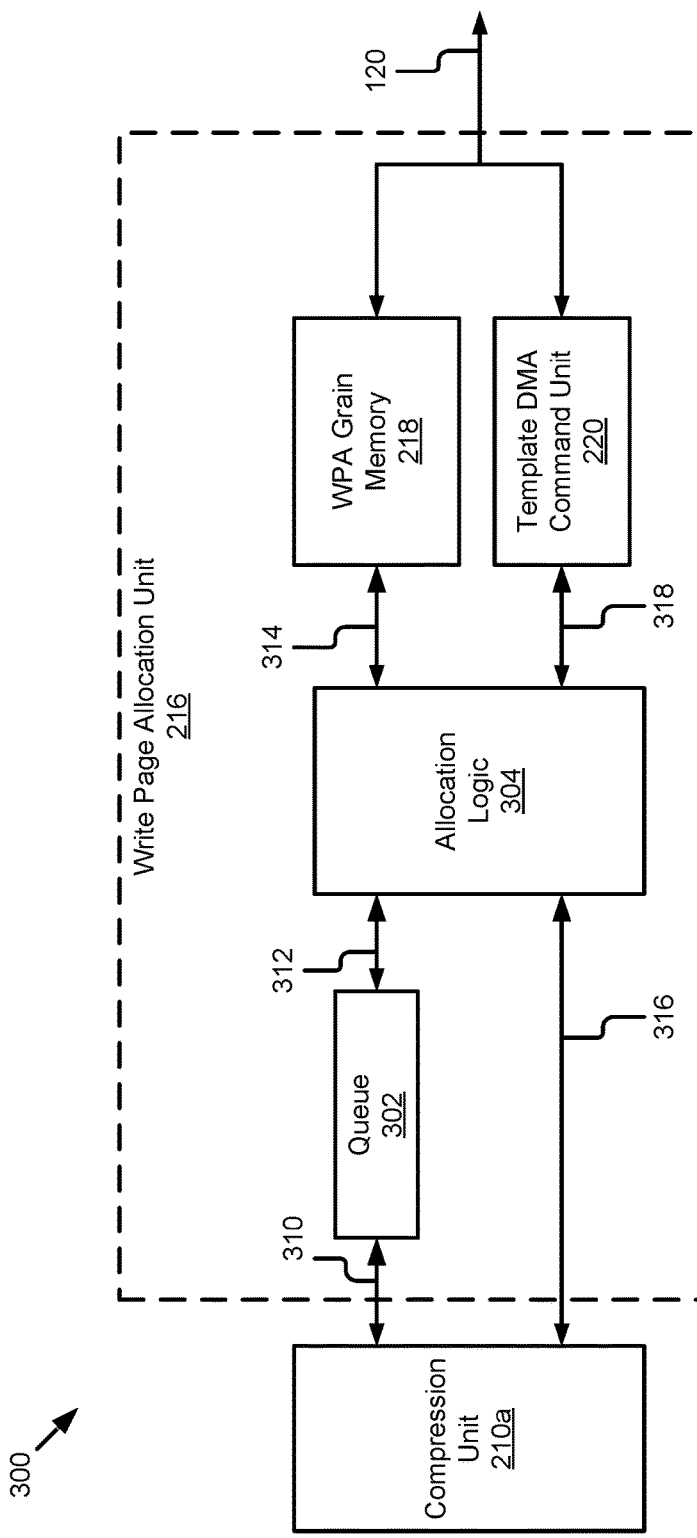
FIG. 3 is a block diagram illustrating an example write page allocation unit according to the techniques described herein.

FIG. 3 is a block diagram illustrating an example 300 write page allocation unit 216 according to the techniques described herein. As depicted in FIG. 3, the write page allocation unit 216 is coupled between the compression unit 210 and the switch 106 (not depicted in FIG. 3). In this embodiment, the write page allocation unit 216 comprises: a queue 302, allocation logic 304, the WPA grain memory 218, and the template DMA command unit 220.

In one embodiment, the compression unit 210a is communicatively coupled with the allocation logic 304 via signal line 316. In some embodiments, the compression unit 210a transmits messages to the allocation logic 304. The messages may include, but are not limited to, requests indicating a number of data grains for transferring from the compression unit 210a to the queue 302 of the WPA unit 216. In one embodiment, the allocation logic 304 transmits a reply message to the compression unit 210a acknowledging the request. Responsive to the transmission of the message and the reply message, the compression unit 210a transmits the number of data grains into the queue 302 for further processing, via signal line 310.

In one embodiment, the allocation logic 304 retrieves the number of data grains from the queue 302 via signal line 312. In some embodiments, the allocation logic 304 retrieves the number of data grains based on a time interval. For example, the allocation logic 304 retrieves a portion of the data grains from the queue 302 at a first time and retrieves a remainder of the data grains from the queue 302 at a second time. In further embodiments, the allocation logic 304, responsive to retrieving the data grains from the queue 302, allocates the data grains into the WPA grain memory 218 via signal line 314, as described elsewhere herein. In other embodiments, the allocation logic 304 while, allocating the data grains into the WPA grain memory 218, simultaneously computes redundancy data associated with each data grain of the data grains and stores the redundancy data in the WPA grain memory 218.

In some embodiments, the allocation logic 304 groups data grains into a predefined data size segment and stores the predefined data size segment into the WPA grain memory 218. For instance, the allocation logic 304 receives 512 byte data grains from the compression unit 210a, the allocation logic 304 then groups and stores incoming 512 byte data grains until a predefined data size segment is satisfied (e.g., a 32K block) and transmits the predefined data size segment to the storage device 110b via signal line 120. In further embodiments, the WPA grain memory 218 may include, but is not limited to, predefined data size segments reflecting storage slots associated with storage devices 110. In other embodiments, the template DMA command unit 220 transmits the predefined data size segment from the WPA grain memory 218 to the storage device 110b via signal line 120.

Referring back to FIG. 3, the template DMA command unit 220 in one embodiment, functions as a direct memory access controller. The template DMA command unit 220 is communicatively coupled with the allocation logic 304 via signal line 318 and the storage device 110b via signal line 120. In some embodiments, the template DMA command unit 220 transfers data grains and redundancy data directly from the WPA grain memory 218 to the storage device 110b via signal line 120. In further embodiments, the template DMA command unit 220 transfers data grains and redundancy data from the storage device 110b via signal line 120 with storing them in the WPA grain memory 218. In other embodiments, the template DMA command unit 220 transfers the predefined data size segment (e.g., 32K data block comprising a plurality of data grains) and/or the redundancy data stored in the WPA grain memory 218 to a corresponding storage device 110 via signal line 120.

Figure 4:
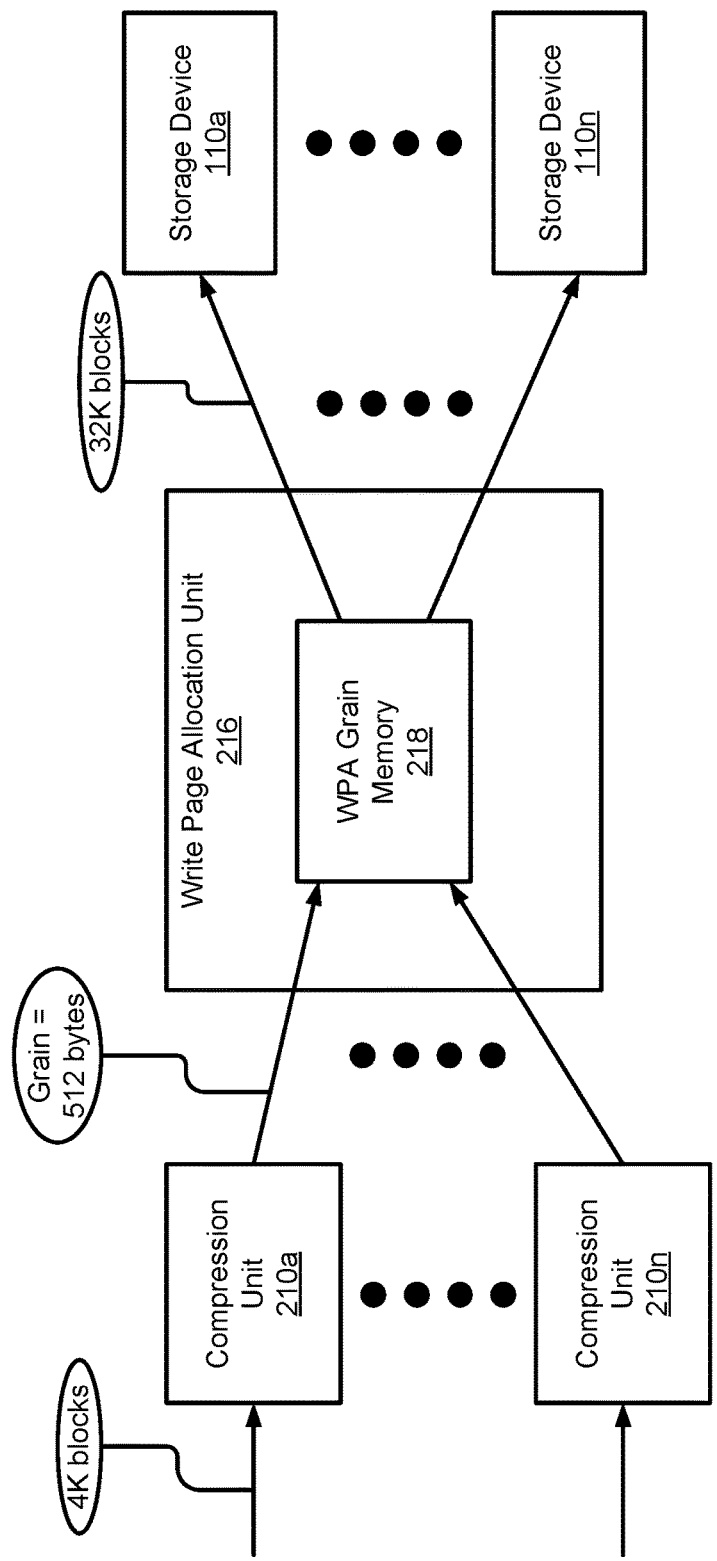
FIG. 4 is a block diagram illustrating example data flow through the write page allocation unit according to the techniques described herein.

FIG. 4 is a block diagram illustrating example data flow through the write page allocation unit 216 according to the techniques described herein. As depicted in FIG. 4, this configuration includes a plurality of the compression units 210a through 210n, the WPA unit 216, the WPA grain memory 218, and a plurality of the storage devices 110a through 110n.

In one embodiment, the compression units 210a-210n receive data blocks. For example, the compression units 210a-210n receive data blocks that are 4K bytes in size. In one embodiment, the compression units 210a-210n reduce (compress) the data blocks into a number of data grains from a (first) size of the data blocks (e.g., 4K bytes data size). For example, the compression units 210a-210n receive data blocks of 4K bytes. The compression units 210a-210n then reduce the 4K data blocks of a first data size (4K) into a number of data grains with a second data size (e.g., 512 bytes). In further embodiments, the compression units 210a-210n transmit the number of data grains of a data size to the WPA unit 216 to perform its acts and/or functionalities thereon.

Referring back to FIG. 4, the WPA unit 216 receives a number of data grains from the compression units 210a through 210n and allocates the data grains into storage of the WPA grain memory 218. In one embodiment, the WPA unit 216 allocates a number of data grains into the WPA grain memory 218 based on a predetermined data layout map, as described elsewhere herein. In some embodiments, the WPA unit 216 allocates the data grains into the WPA grain memory 218 while, simultaneously computing redundancy data associated with each data grain of the data grains and stores the redundancy data in the WPA grain memory 218. In some embodiments, the WPA unit 216 clusters data grains into a predefined data size segment and stores the predefined data size segment into the WPA grain memory 218. For example, the WPA unit 216 receives the 512 byte data grains from the compression units 210a-210n, the WPA unit 216 then clusters the incoming 512 byte data grains and stores the 512 byte data grains in the WPA grain memory 218 until a predefined data size segment is satisfied (e.g., a 32K byte data block). Once a predefined data size segment is satisfied, the WPA unit 216 transmits the predefined data size segment to one or more storage devices 110a through 110n.

Figure 5:
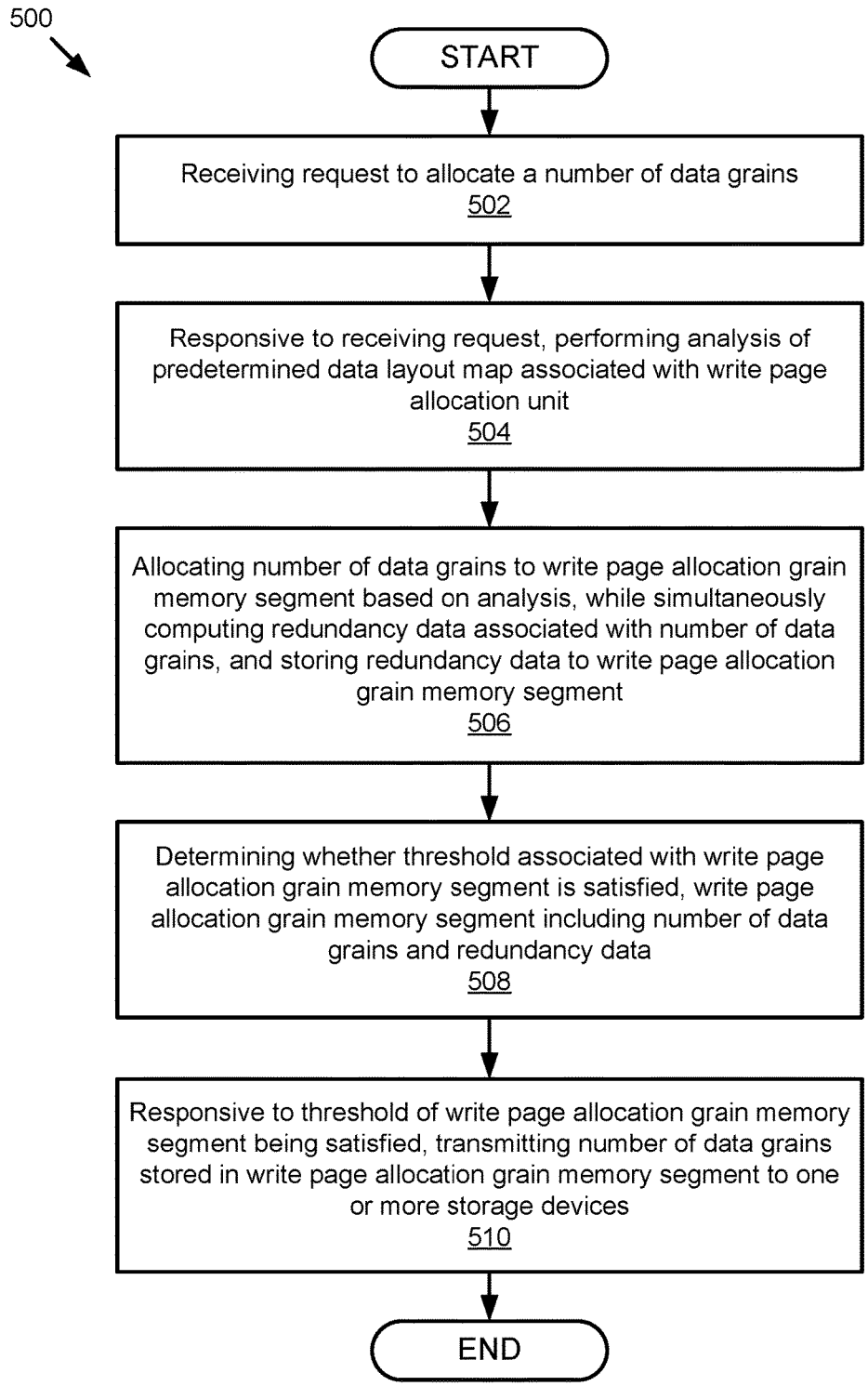
FIG. 5 is a flow chart of an example method for implementing cross device redundancy schemes according to the techniques described herein.

FIG. 5 is a flow chart of an example method 500 for implementing cross device redundancy schemes according to the techniques described herein. The method 500 may begin by receiving 502 a request to allocate a number of data grains. In one embodiment, the WPA unit 216 receives a request from the compression unit 210 to allocate a number of data grains into WPA grain memory 218. In some embodiments, the compression unit 210 transmits a request message to the WPA unit 216. The request message may include, but is not limited to, information indicating a number of data grains for transferring from the compression unit 210 to the WPA grain memory 218 of the WPA unit 216. In one embodiment, the WPA unit 216 transmits a reply message to the compression unit 210 granting the request. In some embodiments, the operation performed in step 502 may be performed by the WPA unit 216 in cooperation with one or more other components of the system 100.

Next, the method 500 responsive to receiving the request continues by, performing 504 an analysis of a predetermined data layout map associated with the WPA unit 216. In one embodiment, the compression unit 210 in cooperation with the WPA unit 216 perform an analysis of the predetermined data layout map. A predetermined data layout map of the WPA unit 216 may include data such as, but not limited to, unavailable location data and a number of available (unrestricted) location data of an active write page associated with the predetermined data layout map. The method 500 may then continue by allocating or identifying 506 the number of data grains to associate with the WPA grain memory 218 segment based on the analysis, while simultaneously computing redundancy data associated with the number of data grains during allocation. In one embodiment, the WPA unit 216 allocates the data grains to the WPA grain memory 218 while concurrently computing redundancy data associated with the data grains. The method in some embodiments may also simultaneously storing the grains and the redundancy data to the WPA grain memory 218 segment.

Next, the method 500 may advance by determining 508 whether a threshold associated with the WPA grain memory 218 segment has been reached. In one embodiment, the WPA grain memory 218 segment includes a number of data grains and/or redundancy data. In some embodiments, the WPA grain memory 218 receives data grains and stores the data grains into a predefined data size segment of the WPA grain memory 218 (segment). For instance, the WPA unit 216 receives 512 byte data grains from the compression unit 210 and groups incoming 512 byte data grains until a predefined data size segment (e.g., threshold) is satisfied (e.g., 32K byte block). The operation performed in step 508 may be performed by the WPA unit 216 in cooperation with one or more other components of the system 100.

The method 500 may then responsive to the threshold of the WPA grain memory 218 segment being satisfied, continue by transmitting 510 the number of data grains stored in the WPA grain memory 218 segment to one or more storage devices 110. In one embodiment, the template DMA command unit 220 transmits the number of data grains stored in the WPA grain memory 218 segment to one or more storage devices 110. After the segment has been transmitted and storage has been confirmed will the segment be deleted from the WPA grain memory 218 thereby ensure complete fault tolerance preventing any loss of data due to power failure or device failure. Those skilled in the art will recognized that the segment and grain sizes described above are merely used by way of example for illustration. Various other sizes for the segments and grains are contemplated as within the scope of the present invention.

Figure 6A:
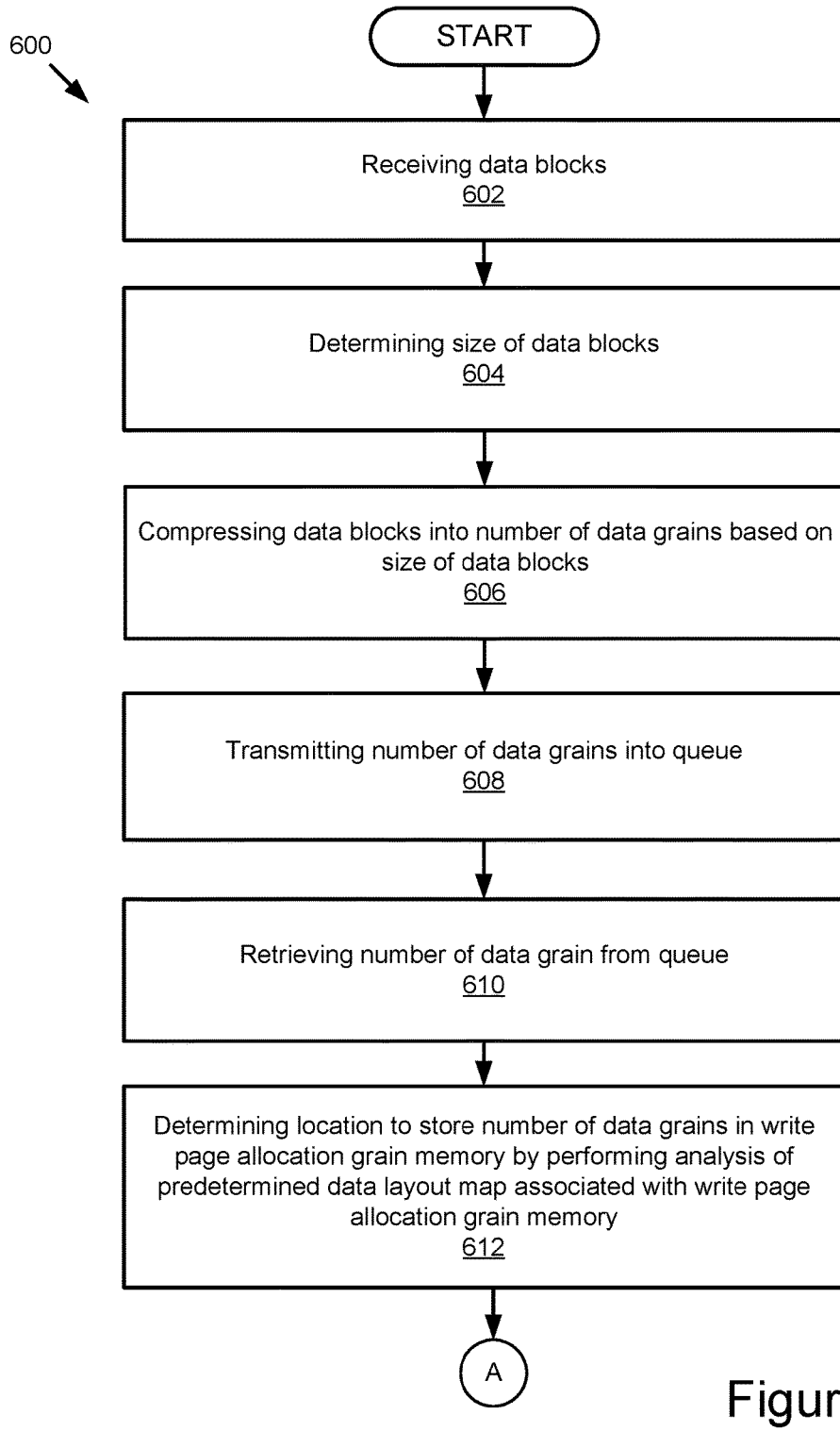
FIGS. 6A and 6B are flow charts of another example method for implementing cross device redundancy schemes according to the techniques described herein.
Figure 6B:
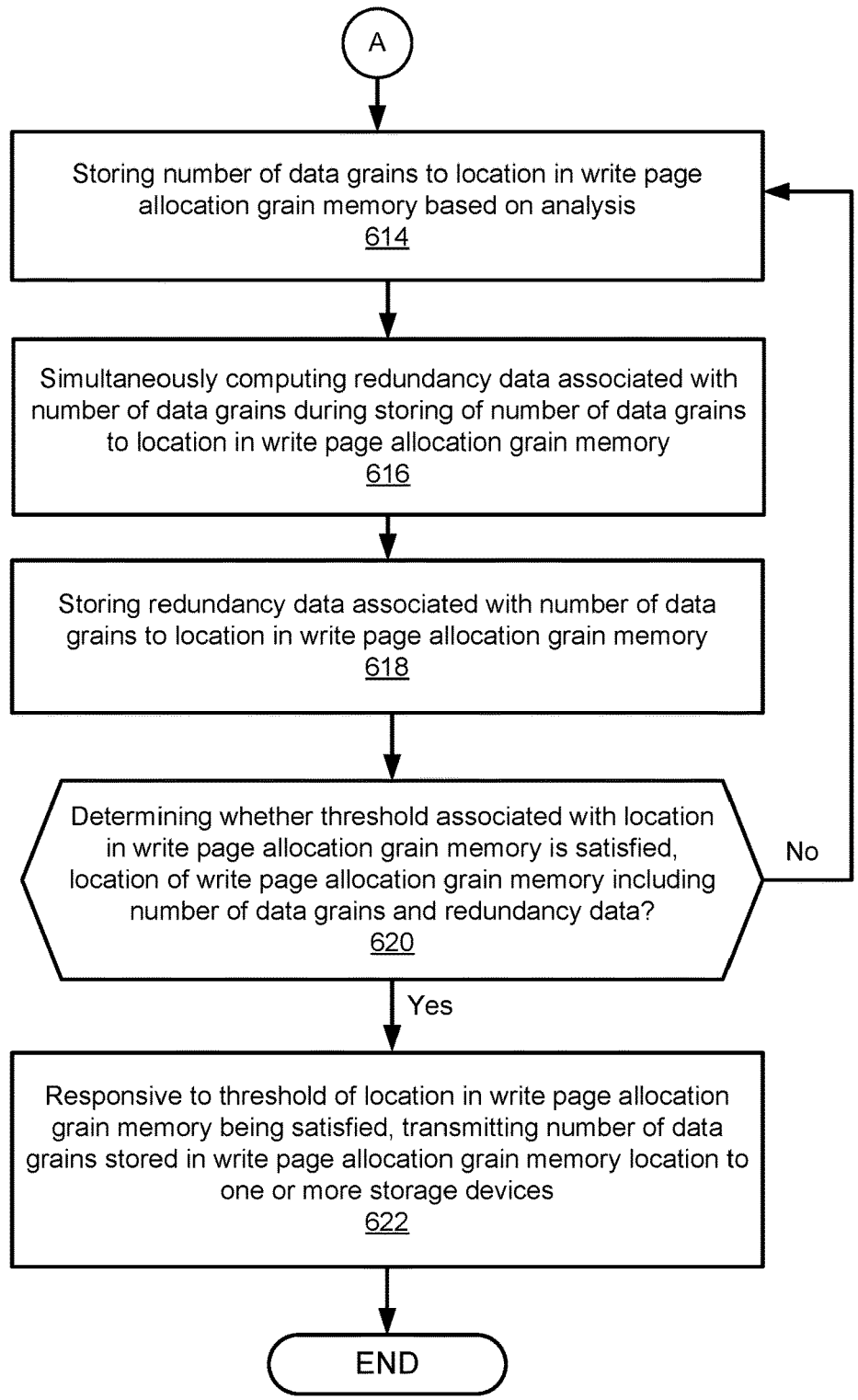

FIGS. 6A and 6B are flow charts of another example method 600 for implementing cross device redundancy schemes according to the techniques described herein. The method 600 begins by receiving 602 data blocks. In one embodiment, the command queue unit 208 receives a data stream including one or more data blocks and transmits the one or more data blocks to the compression unit 210. In some embodiments, the command queue unit 208 receives data packets and transmits the data packets to the compression unit 210. In further embodiments, the compression unit 210 receives data blocks from one or more devices (not depicted).

Next, the method 600 may continue by determining 604 a size of the data blocks. In one embodiment, the command queue unit 208 receives a data stream including one or more data blocks and determines data sizes of each data block. For instance, the command unit 208 receives data blocks from one or more devices and determines that the data size of each data blocks is 4K bytes. In some embodiments, the command queue unit 208 transmits the data blocks and corresponding metadata identifying a data size of each data block to the compression unit 210. The operation performed in step 604 may be performed by the command queue unit 208 in cooperation with the compression unit 210 and/or one or more other components of the system 100.

The method 600 may then advances by compressing 606 the data blocks into a number of data grains based on the size of the data blocks. In one embodiment, the compression unit 210 receives data blocks from the command queue unit 208 and corresponding metadata associated with each data block identifying a data size for the associated data block. In some embodiments, the compression unit 210 compresses the data blocks received from the command queue unit 208 into a number of data grains based on a data size of each data block. It should be understood that the compression unit 210 may compress the incoming data blocks into different numbers of grains based on a variety of different factors including compression type, input data type, compression characteristics, etc. For example, the compression unit 210 receives data blocks with a size of 4K, the compression unit 210 may then compress the data blocks into any number of 512 byte data grains.

Next, the method 600 may continue by transmitting 608 the number of data grains into the queue 302. In one embodiment, the compression unit 210 subsequent to compressing data blocks into a number of data grains, transmits the number of data grains into the queue 302 of the WPA unit 216. In some embodiments, the queue 302 can be in a form of a queue scheduler and the compression unit 210 may transmit the number of data grains to the WPA unit 216 based on a position in the queue scheduler. The operation performed in step 608 may be performed by the command queue unit 208 in cooperation with the compression unit 210 and/or one or more other components of the system 100.

The method 600 may then advance by retrieving 610 the number of data grains from the queue 302. In one embodiment, the WPA unit 216 retrieves a fixed number of data grains from the queue 302 serially. Next, the method 600 may continue by determining 612 a location to store the number of data grains in the WPA grain memory 218 by performing an analysis of a predetermined data layout map associated with the WPA memory 218. In one embodiment, the WPA unit 216 in cooperation with the compression unit 210 determines a location to store the number of data grains in the WPA grain memory 218 by performing an analysis of a predetermined data layout map associated with the WPA grain memory 218. In one embodiment, the analysis performed by the WPA unit 216 may include, but is not limited to, identifying current data-filled locations and a number of unrestricted grain locations (e.g. unfilled grain locations) associated with the predetermined data layout map. In some embodiments, the operation performed in step 612 may be performed by the WPA unit 216 in cooperation with one or more other components of the system 100.

The method 600 may then continue by storing 614 the number of data grains to the location in the WPA grain memory 218 based on the analysis. Next, the method 600 may continue by simultaneously computing 616 redundancy data associated with the number of data grains during storing of the number of data grains to the location in the WPA grain memory 218. The method 600 may then advance by storing 618 the redundancy data associated with the number of data grains to the location in the WPA grain memory 218.

Next, the method 600 may continue by determining 620 whether a threshold associated with the location in the WPA grain memory 218 is satisfied, the location of the WPA grain memory 218 including the number of data grains and the redundancy data. If the threshold associated with the location in the WPA grain memory 218 is not satisfied the method 600 may return to block 614. Otherwise, if the threshold associated with the location in the WPA grain memory 218 is satisfied, then the method 600 may advance by transmitting 622 the number of data grains stored in the WPA grain memory 218 location to one or more storage devices 110 and the method 600 may end.

Figure 7:
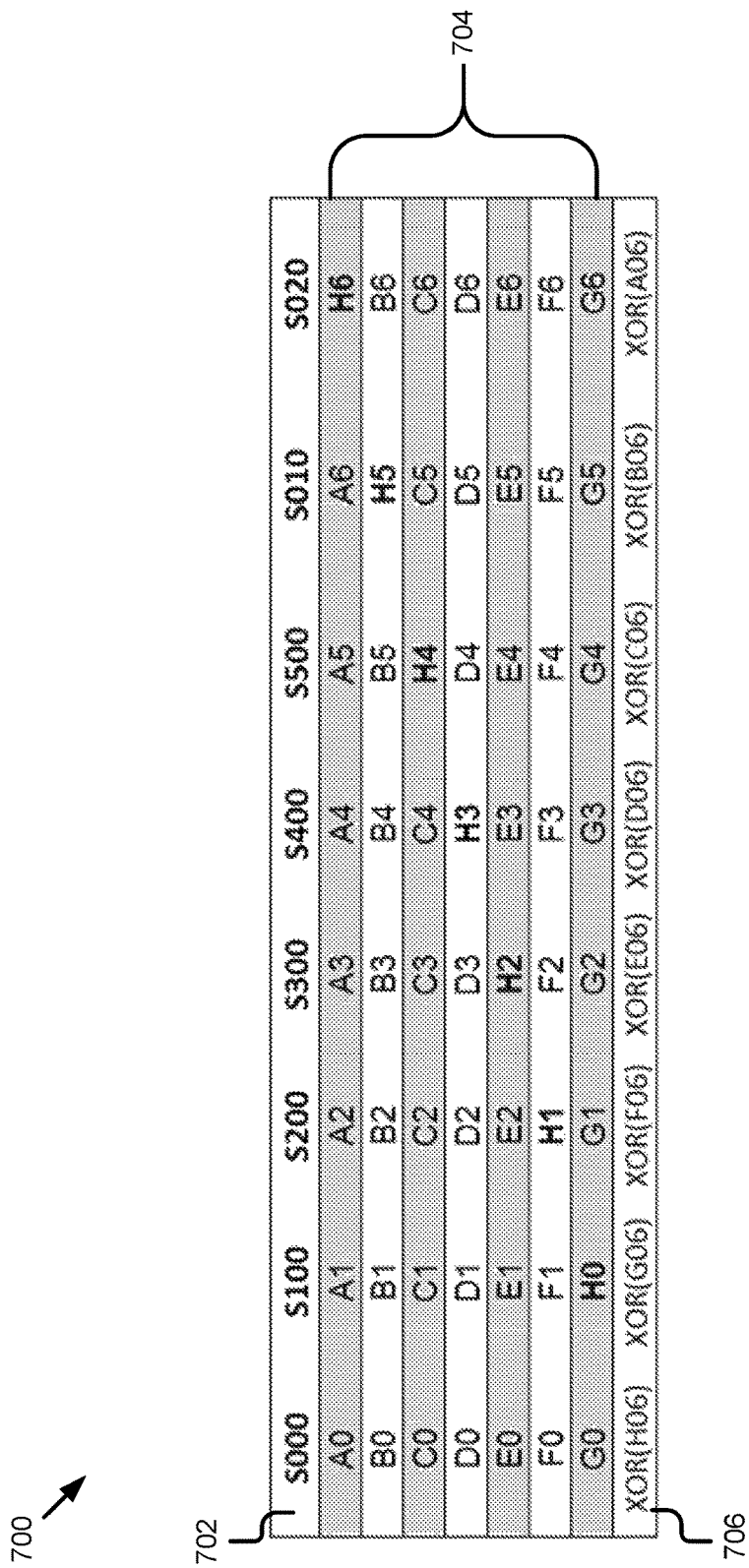
FIG. 7 is an example graphical representation illustrating data layout as seen by the write page allocation unit according to the techniques described herein.

FIG. 7 is an example graphical representation illustrating data layout as seen by the WPA unit 216 according to the techniques described herein. As depicted in FIG. 7, a data layout map 700 may include a header 702, data blocks 704, and reserved data blocks 706. In one embodiment, the WPA unit 216 writes data across multiple devices in parallel based on the data layout map 700. For instance, locations associated with data blocks 704 of the data layout map 700 may correspond to a location for storing the data blocks 704 on one or more storage devices 110. In some embodiments, data blocks 704 can be associated with user data received from a client device (e.g., client device 102). User data may include, but is not limited to, a document, email, multimedia data (e.g. audio, video, combination of audio and video), a picture file, qualitative data, quantitative data, applications, etc. In further embodiments, the data blocks 704 are associated with a predetermined data size (e.g., 512 bytes, 4K bytes, 32K bytes). For example, the data blocks 704 can be representative of compressed data blocks (512 byte data grains), compressed by the compression unit 210, as described elsewhere herein.

Referring back to the data layout map 700 of FIG. 7, in one embodiment, header 702 may include information associated with corresponding data blocks of a column and/or row associated with the data layout map 700. For instance, header 702 may indicate grain position. A grain position may indicate a location of a data block with reference to a data layout map 700. For example, a grain position can be representative of a mapping between a logical location of a data block to a physical storing location on a storage device 110. In some embodiments, header 702 may include additional predefined information associated with data blocks 704/706 of the data layout map 700 (e.g. header S000, S100, S200, etc.). A non-limiting example of additional predefined information provided by header 702 may include information such as, a reference ID to a particular storage device, a first indicator for a channel for the particular storage device, and a second indicator for a sub-channel in a particular storage device. In further embodiments, header 702 can be associated with a backend storage device 110 comprising of one or more drive units.

Referring back to the data layout map 700 of FIG. 7, in one embodiment, data layout map 700 depicts reserved data blocks 706 (e.g., parity rows). In some embodiments, each reserved data block 706 can be reserved for XOR (RAID) parity grain entry. In further embodiments, the reserved data block 706 are modified and updated based on incoming compressed data blocks (512 byte data grains and/or 32K byte data segments), as described elsewhere herein. For instance, as compressed data blocks of an incoming compressed data grains flows into data layout map 700, a corresponding parity grain (redundancy data block of reserved data block 706) is read and modified to reflect new data associated with the compressed data block. In one embodiment, once a parity grain (reserved data block) of a corresponding data block 704 is computed and updated, the compressed data block is protected against device failure (e.g. storage device 110) or power failure, as described elsewhere herein. In some embodiments, blocks (H0, H1, and H2 through H6) may reflect redundancy/parity data associated with a particular data block. In further embodiments, the WPA unit 216 generates redundancy data that is associated with a data block and can be divided into segments and distributed among S100-S020 for reconstruction of the data block in scenarios where a device failure occurs. For instance, H0 can be a complete (sum) redundancy/parity data of a data block while; H1-H6 may include portions of the redundancy/parity data of the data block. Therefore, responsive to a device failure of a device (e.g. S100) that is receiving a data block, the WPA unit 216 and/or other components of the system 100 can use the redundancy/parity data stored on the different devices/drives (S200-S020) to reconstruct the lost data block associated with the device/drive failure.

Figure 8:
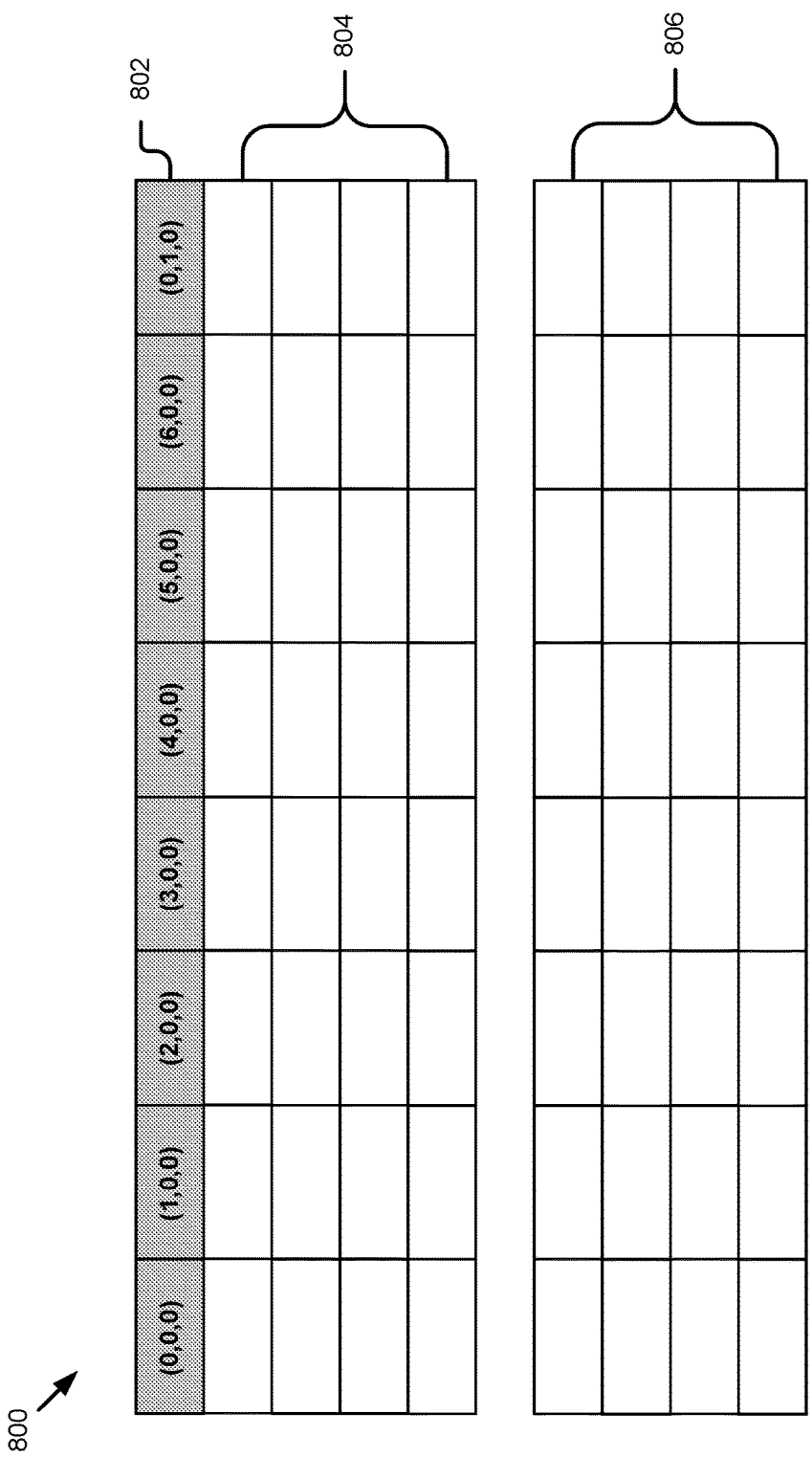
FIG. 8 is an example graphical representation illustrating device columns that span multiple backend storage devices according to the techniques described herein.

FIG. 8 is an example graphical representation of a 800 data layout map illustrating device columns that span multiple backend storage devices according to the techniques described herein. As depicted in FIG. 8, a data layout map 800 may include a header 802, data blocks 804, and redundancy data blocks 806. In one embodiment, one or more components of system 100 write data across multiple devices (e.g. storage devices 110a-110n) in parallel based on the data layout map 800. For instance, one or more locations associated with one or more data blocks 804 of the data layout map 800 may correspond to a location for storing the data blocks 804 on storage devices 110. In some embodiments, data blocks 804 can be a particular data size. For example, the data blocks 804 can be representative of compressed data blocks (512 byte data grains and/or 32K data segments), compressed (reduced) by the compression unit 210 into a predetermined data size, as described elsewhere herein. In further embodiments not shown, the multiple devices can form a single backend device unit (DU).

Referring back to the data layout map 800 of FIG. 8, in one embodiment, header 802 may include information associated with corresponding data blocks of a column and/or row associated with the data layout map 800. For instance, header 802 may indicate grain position (e.g. in memory device and/or multiple memory devices that are members of a backend device unit). A grain position may indicate a location of a data block with reference to a data layout map 800. In one embodiment, a grain position can be representative of a mapping between a logical location of a data block to a physical storing location on a storage device 110. In some embodiments, header 802 may include additional predefined information associated with data blocks 804/806 of the data layout map 800. Non-limiting examples of additional information provided by header 802 may include information such as, a reference ID to a particular storage device, a first indicator for a channel for the particular storage device, and a second indicator for a sub-channel in a particular storage device.

In some embodiments, header 802 can be associated with a backend storage device comprising of one or more drive units. In one embodiment, one or more components of system 100 can modify and update information associated with header 802 based on a device type (e.g. single storage backend unit, backend unit including a drive unit). For instance, predefined information associated with a backend storage device comprising one or more drive units may include information such as, but is not limited to, a drive ID, a segment offset within one or more drives, and a sector offset within a segment of a drive and/or data layout map. Referring back to the data layout map 800 of FIG. 8, in one embodiment, data layout map 800 depicts redundancy data blocks 806 (e.g., parity rows). In some embodiments, each redundancy data block of the redundancy data blocks 806 may reflect a parity grain entry. In further embodiments, the redundancy data blocks 806 are modified and updated based on incoming compressed data blocks, as described elsewhere herein. For instance, as compressed data blocks (data grains and/or 32K data segments) are mapped into data layout map 800 (of the WPA unit 216), a corresponding parity grain (redundancy data block of redundancy data blocks 806) is read and modified to reflect new data associated with the compressed data block. In one embodiment, once a parity grain (redundancy data block) of a corresponding data block 804 is computed and updated, the compressed data block is protected against device (e.g. storage device 110) power failure, as described elsewhere herein.

Systems and methods for providing a highly reliable system for implementing cross device redundancy schemes are described below. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
    receiving, by a write page allocation unit, a request to allocate data grains;
    responsive to receiving the request, performing, by the write page allocation unit, an analysis of a predetermined data layout map associated with a grain memory to identify a memory segment;
    allocating, by the write page allocation unit, a number of data grains to the memory segment, while computing redundancy data associated with the number of data grains;
    storing the number of data grains and the redundancy data to the memory segment of the grain memory;
    determining, by the write page allocation unit, whether a storage threshold associated with the grain memory has been satisfied; and
    responsive to the storage threshold associated with the grain memory being satisfied, transmitting data grains and redundancy data stored in the memory segment to one or more storage devices.

2. The method of claim 1, further comprising:
    receiving, by a compression unit from a client device, a data stream; and
    compressing, by a compression unit, the data stream into a plurality of data grains.

3. The method of claim 1, wherein the analysis of the predetermined data layout map associated with the grain memory, further comprises:
    identifying an active write page associated with the predetermined data layout map;
    retrieving a pointer associated with presently stored data grains in the active write page of the predetermined data layout map;
    determining unavailable location data associated with the active write page based on the pointer, the unavailable location data reflecting occupied storage space; and
    determining available location data associated with the active write page of the predetermined data layout map based on the pointer.

4. The method of claim 1, wherein storing the number of data grains and the redundancy data to the memory segment of the grain memory includes storing the redundancy data into one or more pre-provisioned memory buffers of the grain memory.

5. The method of claim 4, wherein allocating the number of data grains to the memory segment, further comprises computing, valid bits per the one or more pre-provisioned memory buffers based on incoming data grains.

6. The method of claim 1, further comprising:
    recording a starting location associated with the predetermined data layout map for a first data grain associated with the number of data grains being allocated to the memory segment; and
    updating the predetermined data layout map associated with the grain memory based on the allocating of the number of data grains.

7. The method of claim 1, wherein transmitting data grains and redundancy data stored in the memory segment further comprises storing in parallel the data grains and redundancy data across a plurality of storage devices.

8. The method of claim 1, wherein transmitting data grains and redundancy data stored in the memory segment uses a preconfigured template.

9. The method of claim 1, wherein transmitting data grains and redundancy data stored in the memory segment, further comprises:
    generating, a template for transmitting data grains and redundancy data to a plurality of storage devices; and
    transferring data grains and redundancy data directly from the grain memory to the plurality of storage devices using the template.

10. The method of claim 9, wherein the template comprises at least an offset and a number of bytes associated with the data grains and redundancy data.

11. The method of claim 1, wherein the storage threshold is 32K bytes.

12. The method of claim 1, wherein the grain size is 512 bytes.

13. The method of claim 1, wherein allocating the number of data grains to the memory segment is performed simultaneously with computing redundancy data associated with the number of data grains.

14. A system for storage and data reduction comprising:
- a compression unit having an input and an output for compressing data, the input of the compression unit coupled to receive a data stream, the compression unit compressing the data stream to produce data grains;
- a write page allocation unit having an input and an output for transferring data grains to one or more storage devices and generating redundancy data, the input of the write page allocation unit coupled to the output of the compression unit to receive data grains, the output of write page allocation unit coupled to the one or more storage devices; and
- a grain memory for temporarily storing data and having an input and an output, the input coupled to the write page allocation unit and the output coupled to the one or more storage devices.

15. The system of claim 14 further comprising an encryption unit having in an input and an output for encoding the data to produce an encoded data stream, the input of the encryption unit coupled to receive the data stream and the output of the encryption unit coupled to an input of the write page allocation unit.

16. The system of claim 14 wherein the write page allocation unit simultaneously computes redundancy data associated with a number of data grains and allocates the number of data grains to the grain memory.

17. The system of claim 14 wherein the one or more storage devices are a plurality of solid state storage devices.

18. The system of claim 14 wherein the write page allocation unit stores a number of data grains and the redundancy data in parallel across multiple solid state storage devices.

19. The system of claim 14 wherein portions of the grain memory are pre-provisioned for the redundancy data.

20. The system of claim 14 wherein the write page allocation unit uses a single commit to store the data grains and redundancy data to the one or more storage devices.

21. The system of claim 14 further comprising:
- allocation logic for analyzing a predetermined data layout map associated with the grain memory to identify a memory segment of the grain memory for temporary storage of data grains, the allocation logic coupled to the compression unit and the grain memory; and
- a data queue for temporarily storing grains until they can be stored in the grain memory, the data queue having an input and an output, the input coupled to the data queue coupled to the compression unit and the output of the data queue coupled to the allocation logic.

22. The system of claim 21 wherein the analyzing includes identifying an active write page associated with the predetermined data layout map; retrieving a pointer associated with presently stored data grains in the active write page of the predetermined data layout map; determining unavailable location data associated with the active write page based on the pointer, the unavailable location data reflecting occupied storage space; and determining available location data associated with the active write page of the predetermined data layout map based on the pointer.

23. The system of claim 21 further comprising a DMA command unit for transferring data from the grain memory directly to the one or more storage devices, the DMA command unit coupled for communication with the allocation logic and the one or more storage devices.

24. The system of claim 23, where in the DMA command unit uses a preconfigured template to transfer data grains and redundancy data from grain memory to the one or more storage devices.

* * * * *